US010135098B2

(12) United States Patent
Xie et al.

(10) Patent No.: US 10,135,098 B2
(45) Date of Patent: Nov. 20, 2018

(54) METHOD AND SYSTEM FOR DYNAMICALLY ADJUSTING BATTERY UNDERVOLTAGE PROTECTION

(71) Applicant: Dongguan NVT Technology Co., LTD., Dongguan (CN)

(72) Inventors: Hong Xie, Dongguan (CN); Guanghui Chen, Dongguan (CN)

(73) Assignee: Dongguan NVT Technology Co., Ltd., Dongguan (CN)

( * ) Notice: Subject to any disclaimer, the term of this patent is extended or adjusted under 35 U.S.C. 154(b) by 0 days.

(21) Appl. No.: 15/201,266

(22) Filed: Jul. 1, 2016

(65) Prior Publication Data
US 2017/0250450 A1    Aug. 31, 2017

(30) Foreign Application Priority Data
Feb. 29, 2016    (CN) .......................... 2016 1 0113596

(51) Int. Cl.
*H01M 10/42*    (2006.01)
*H01M 10/44*    (2006.01)
(Continued)

(52) U.S. Cl.
CPC ..... *H01M 10/4257* (2013.01); *H01M 10/425* (2013.01); *H01M 10/443* (2013.01);
(Continued)

(58) Field of Classification Search
CPC .......... H01M 10/4257; H01M 10/486; H01M 10/48; H01M 10/443; H02H 7/18
See application file for complete search history.

(56) References Cited

U.S. PATENT DOCUMENTS

| 6,331,763 B1* | 12/2001 | Thomas ................. H02H 9/042 320/136 |
| 2012/0176097 A1 | 7/2012 | Takezawa et al. |
| 2016/0056623 A1 | 2/2016 | Henry et al. |

FOREIGN PATENT DOCUMENTS

| CN | 2850140 Y | 12/2006 |
| CN | 101783504 A | 7/2010 |

(Continued)

OTHER PUBLICATIONS

From EPO Application No. 16175489.0, European Search Report and Search Opinion dated Aug. 30, 2016.
(Continued)

*Primary Examiner* — Helen Oi K Conley
(74) *Attorney, Agent, or Firm* — Ladas & Parry, LLP

(57) ABSTRACT

The present invention provides a method for dynamically adjusting battery undervoltage protection, including: real time acquiring a current operation environment temperature value of a battery; real time selecting a preset undervoltage protection voltage and a preset undervoltage protection delay time according to the temperature value; real time determining whether an output voltage of the battery is less than the undervoltage protection voltage; if yes, then: determining whether a time interval when the output voltage of the battery is less than the undervoltage protection voltage satisfies the undervoltage protection delay time, if yes, then: enabling the battery undervoltage protection. The present invention is capable of performing a flexible battery undervoltage protection according to a current operation environment temperature of the battery. The present invention also provides a system for dynamically adjusting battery undervoltage protection.

12 Claims, 3 Drawing Sheets

(51) Int. Cl.
*H02H 7/18* (2006.01)
*H02J 7/00* (2006.01)
*H01M 10/48* (2006.01)

(52) U.S. Cl.
CPC ......... *H01M 10/48* (2013.01); *H01M 10/486* (2013.01); *H02H 7/18* (2013.01); *H02J 7/0029* (2013.01); *H01M 2010/4271* (2013.01); *H01M 2010/4278* (2013.01); *H02J 2007/004* (2013.01)

(56) References Cited

FOREIGN PATENT DOCUMENTS

| | | | |
|---|---|---|---|
| CN | 103956710 A | 7/2014 | |
| FR | 2949909 A1 | 3/2011 | |
| JP | 3416395 B2 | 6/2003 | |
| JP | 2004/248405 A | 9/2004 | |
| JP | 2011/004585 A | 1/2011 | |
| JP | 2011/172475 A | 9/2011 | |
| JP | 2014/103831 A | 6/2014 | |
| TW | 201143248 A | 12/2011 | |
| WO | WO2007/006121 | * 1/2007 | ............. G01R 31/36 |

OTHER PUBLICATIONS

From JP Application No. 2016-117896, Office Action dated Mar. 14, 2017 with English translation provided by Japanese associate.
From JP Application No. 2016-117896, Decision of Rejection dated Jun. 27, 2017 with English translation provided by Japanese associate.
From CN Application No. 201610113596.5, Search Report dated Nov. 19, 2017.
From CN Application No. 201610113596.5, Office Action dated Nov. 29, 2017 with machine English translation (Google Translate; OCR by Adobe Acrobat Pro).

* cited by examiner

METHOD AND SYSTEM FOR DYNAMICALLY ADJUSTING BATTERY UNDERVOLTAGE PROTECTION

CROSS-REFERENCE TO RELATED APPLICATION

This application claims the priority to and the benefit of Chinese Patent Application No. 201610113596.5 filed on Feb. 29, 2016, the disclosure of which is incorporated herein by reference in its entirety.

TECHNICAL FIELD

The present invention relates to the field of battery technologies and, more particularly, to a method and system for dynamically adjusting battery undervoltage protection.

BACKGROUND

Currently, in use of a battery, when the battery power is excessively low or for other abuse reasons, such as excessive battery internal resistance and excessive output power caused when the operation environment temperature of the battery is too low, the output voltage will become too low. If the battery power is sufficient, such a situation will not affect the battery system, however, if there is less battery power or an undervoltage process is too long, then the voltage will be less than a minimum discharge voltage, if such a phenomenon occurs for a long time, cycle lifetime and discharge efficiency of the battery will be seriously affected, and therefore, there is a need to provide undervoltage protection for the battery.

The existing battery undervoltage protection method is generally performed by setting a minimum undervoltage protection voltage value as a trigger point of enabling an undervoltage protection circuit, since the battery has large current impedance at a low temperature, the existing method is adopted in the case where the battery has much power, high current interception easily causes undervoltage protection in a short time, so that the majority of the power is not utilized efficiently and undervoltage protection for the battery cannot be performed flexibly.

SUMMARY

The present invention provides a method for dynamically adjusting battery undervoltage protection, so as to achieve a flexible battery undervoltage protection.

Preferably, the method for dynamically adjusting battery undervoltage protection is preferably directed to a lithium battery;

More preferably, the lithium battery includes a lithium ion battery, a lithium metal battery, a lithium-sulfur battery and a lithium air battery;

The present invention provides a method for dynamically adjusting battery undervoltage protection, including:

real time acquiring a current operation environment temperature value of a battery;

real time selecting a preset undervoltage protection voltage and a preset undervoltage protection delay time according to the temperature value;

real time determining whether an output voltage of the battery is less than the undervoltage protection voltage; if yes, then:

determining whether a time interval when the output voltage of the battery is less than the undervoltage protection voltage satisfies the undervoltage protection delay time, if yes, then:

enabling the battery undervoltage protection.

Preferably, the real time selecting a preset undervoltage protection voltage and a preset undervoltage protection delay time according to the temperature value includes:

determining whether the temperature value is more than or equal to a normal temperature value T1, if yes, then selecting an undervoltage protection voltage V1 and an undervoltage protection delay time t1, if no, then:

determining whether the temperature value is more than a low temperature value T2 and less than the normal temperature value T1, if yes, then selecting an undervoltage protection voltage V2 and an undervoltage protection delay time t2, if no, then:

determining whether the temperature value is less than or equal to the low temperature value T2, if yes, then selecting an undervoltage protection voltage V3 and an undervoltage protection delay time t3.

Preferably, the normal temperature value T1 is 20° C., and the low temperature value T2 is 5° C.

Preferably, the undervoltage protection voltage V1 is 3.0V, the undervoltage protection voltage V2 is 2.8V, and the undervoltage protection voltage V3 is 2.6V.

Preferably, after enabling the battery undervoltage protection, the method further includes:

detecting remaining power of the battery;

determining whether the remaining power of the battery is less than a certain value of the undervoltage protection voltage, if yes, then:

reducing an output power of the battery.

A system for dynamically adjusting battery undervoltage protection, including:

an acquiring unit, configured to real time acquire a current operation environment temperature value of a battery;

a selecting unit, configured to real time select a preset undervoltage protection voltage and a preset undervoltage protection delay time according to the temperature value acquired by the acquiring unit;

a first determining unit, configured to real time determine whether an output voltage of the battery is less than the undervoltage protection voltage;

a second determining unit, configured to determine whether a time interval when the output voltage of the battery is less than the undervoltage protection voltage satisfies the undervoltage protection delay time, when the first determining unit determines that the output voltage of the battery is less than the undervoltage protection voltage; and an enabling unit, configured to enable the battery undervoltage protection when the second determining unit determines the time interval when the output voltage of the battery is less than the undervoltage protection voltage satisfies the undervoltage protection delay time.

Preferably, the selecting unit is specifically configured to:

determine whether the temperature value is more than or equal to a normal temperature value T1, if yes, then select an undervoltage protection voltage V1 and an undervoltage protection delay time t1, if no, then:

determine whether the temperature value is more than a low temperature value T2 and less than the normal temperature value T1, if yes, then select an undervoltage protection voltage V2 and an undervoltage protection delay time t2, if no, then:

determine whether the temperature value is less than or equal to the low temperature value T2, if yes, then select an undervoltage protection voltage V3 and an undervoltage protection delay time t3.

Preferably, the normal temperature value T1 is 20° C., and the low temperature value T2 is 5° C.

Preferably, the undervoltage protection voltage V1 is 3.0V, the undervoltage protection voltage V2 is 2.8V, and the undervoltage protection voltage V3 is 2.6V.

Preferably, the system further includes:

a detecting unit, configured to detect remaining power of the battery;

a third determining unit, configured to determine whether the remaining power of the battery is less than a certain value of the undervoltage protection voltage; and a control unit, configured to reduce an output power of the battery when the third determining unit determines that the remaining power of the battery is less than a certain value of the undervoltage protection voltage.

As can be seen from the above technical solutions, the present invention provides a method for dynamically adjusting battery undervoltage protection, by real time acquiring an operation environment temperature value of a battery, and real time selecting a preset undervoltage protection voltage and a preset undervoltage protection delay time of the battery according to the acquired temperature value, and enabling the battery undervoltage protection when a time interval when the output voltage of the battery is less than the undervoltage protection voltage satisfies the undervoltage protection delay time, and it can be seen that, comparing to the prior art, the method of the present invention can appropriately select an undervoltage protection condition according to an operation environment temperature of the battery, so that a flexible battery undervoltage protection can be achieved.

BRIEF DESCRIPTION OF DRAWINGS

In order to illustrate embodiments of the present invention or the technical solution in the prior art more clearly, accompanying drawings needed for describing the embodiments or the prior art will be introduced in brief hereinafter. Apparently, the accompanying drawings show certain embodiments of the invention, and persons skilled in the art can derive other drawings from them without creative efforts.

DESCRIPTION OF EMBODIMENTS

In order to make the objects, technical solutions, and advantages of embodiments of the present invention clearer, the technical solutions in the embodiments of the present invention are hereinafter described clearly and completely with reference to the accompanying drawings in the embodiments of the present invention. Obviously, the embodiments described here are part of the embodiments of the present invention but not all of the embodiments. All other embodiments obtained by persons skilled in the art on the basis of the embodiments of the present invention without any creative efforts all fall within the scope of the present invention.

Figure 1:
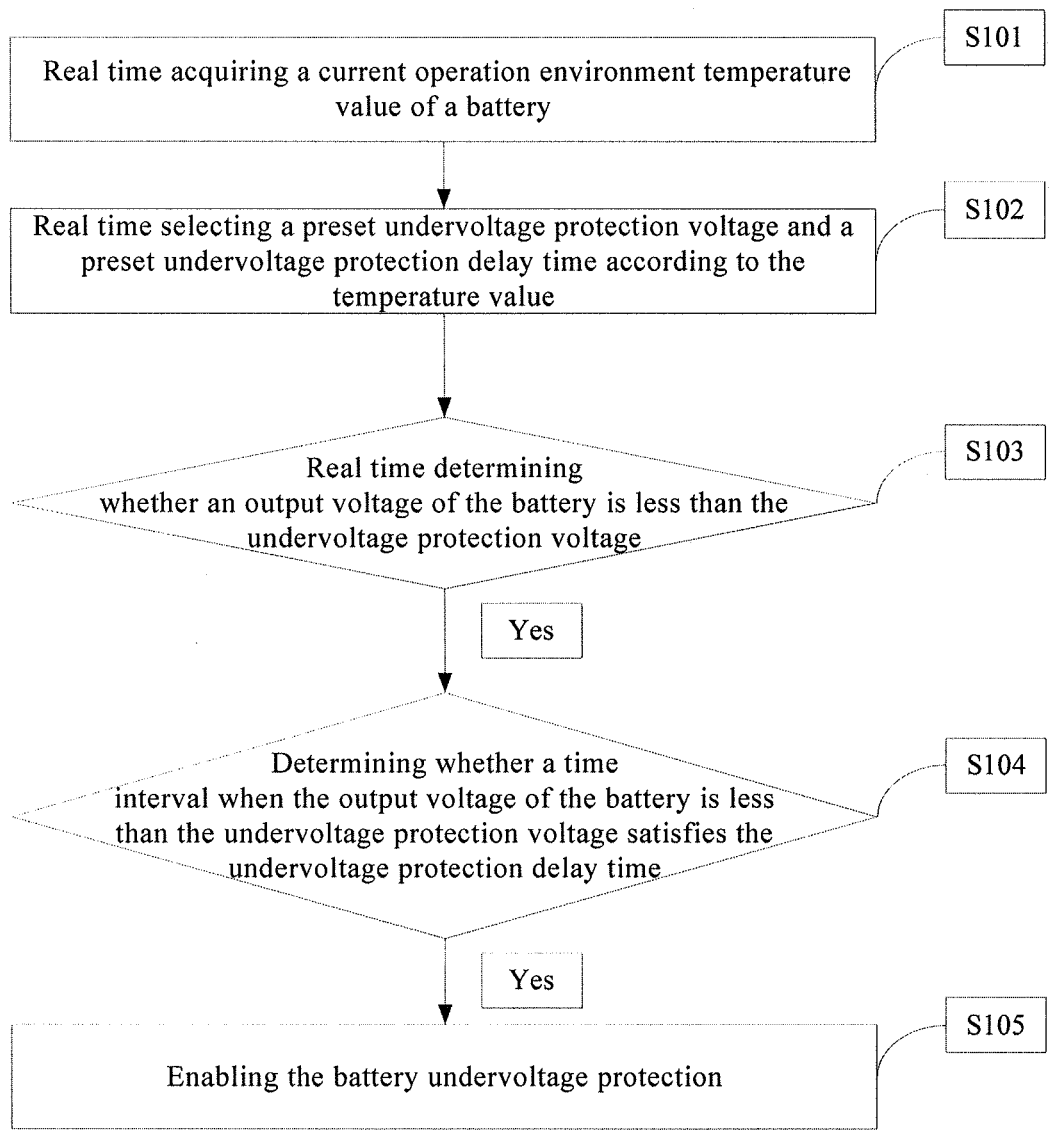
FIG. 1 is a flowchart of a method for dynamically adjusting battery undervoltage protection according to Embodiment 1 of the present invention.

FIG. 1 is a flowchart of a method for dynamically adjusting battery undervoltage protection according to Embodiment 1 of the present invention, as shown in FIG. 1, the method in this embodiment can include steps as follows:

S101, Real time acquiring a current operation environment temperature value of a battery;

Taking a lithium battery as an example, during the operation of the lithium battery, real time detecting an operation environment temperature of the lithium battery to acquire the current operation environment temperature value of the lithium battery.

S102, Real time selecting a preset undervoltage protection voltage and a preset undervoltage protection delay time according to the temperature value;

After a real-time temperature value of the lithium battery in the current operation environment is acquired, undervoltage protection parameters of the lithium battery are set in real time according to the acquired temperature value, that is, a preset undervoltage protection voltage and a preset undervoltage protection delay time are selected, particularly, the undervoltage protection voltage and the undervoltage protection delay time are preset according to the specific application situations of the lithium battery, such as a power level of the output device being used.

S103, Real time determining whether an output voltage of the battery is less than the undervoltage protection voltage; if yes, then proceeding to S104:

After the undervoltage protection voltage is determined according to the current operation environment temperature value of the lithium battery, determine the real-time output voltage of the lithium battery, and determine whether the output voltage of the lithium battery is less than the undervoltage protection voltage, that is, determine whether a condition of undervoltage protection is satisfied.

S104, Determining whether a time interval when the output voltage of the battery is less than the undervoltage protection voltage satisfies the undervoltage protection delay time, if yes, then proceeding to S105:

When the output voltage of the lithium battery is determined to be less than the undervoltage protection voltage, a timer starts to count, and determine whether a time interval when the output voltage of the lithium battery is less than the undervoltage protection voltage satisfies the undervoltage protection delay time.

S105, Enabling the battery undervoltage protection.

When the output voltage of the lithium battery is less than the undervoltage protection voltage, and meanwhile, the time interval when the output voltage of the lithium battery is less than the undervoltage protection voltage satisfies the undervoltage protection delay time, enable the battery undervoltage protection.

In the above embodiment, by real time acquiring an operation environment temperature value of the battery, and real time selecting a preset undervoltage protection voltage and a preset undervoltage protection delay time of the battery according to the acquired temperature value, and enabling the battery undervoltage protection when a time interval when the output voltage of the battery is less than the undervoltage protection voltage satisfies the undervoltage protection delay time. It can be seen that, comparing to the prior art, the method in the present invention can appropriately select an undervoltage protection condition according to an operation environment temperature of the battery, so that a flexible battery undervoltage protection can be achieved.

Particularly, in the above embodiment, one of the implementations for real time selecting the preset undervoltage protection voltage and the preset undervoltage protection delay time according to the temperature value in step 102 can be:

The normal temperature value T1, the low temperature value T2, the undervoltage protection voltage V1, the undervoltage protection voltage V2, the undervoltage protection voltage V3, the undervoltage protection delay time t1 and the undervoltage protection delay time t2 and the undervoltage protection delay time t3 are preset according to the specific application situations of the battery.

Determine the current operation environment temperature value of the battery, when the temperature value is more than or equal to the normal temperature value T1, select the undervoltage protection voltage V1 and the undervoltage protection delay time t1; when the temperature value is more than the low temperature value T2 and less than the normal temperature value T1, select the undervoltage protection voltage V2 and the undervoltage protection delay time t2; when the temperature value is less than or equal to the low temperature value T2, select the undervoltage protection voltage V3 and the undervoltage protection delay time t3. Particularly, the normal temperature value T1 can be set to 20° C., and the low temperature value T2 can be set to 5° C. The undervoltage protection voltage V1 can be set to 3.0V, the undervoltage protection voltage V2 can be set to 2.8V, and the undervoltage protection voltage V3 can be set to 2.6V. The undervoltage protection delay time t1, the undervoltage protection delay time t2 and the undervoltage protection delay time t3 can all be set to 5 s.

Figure 2:
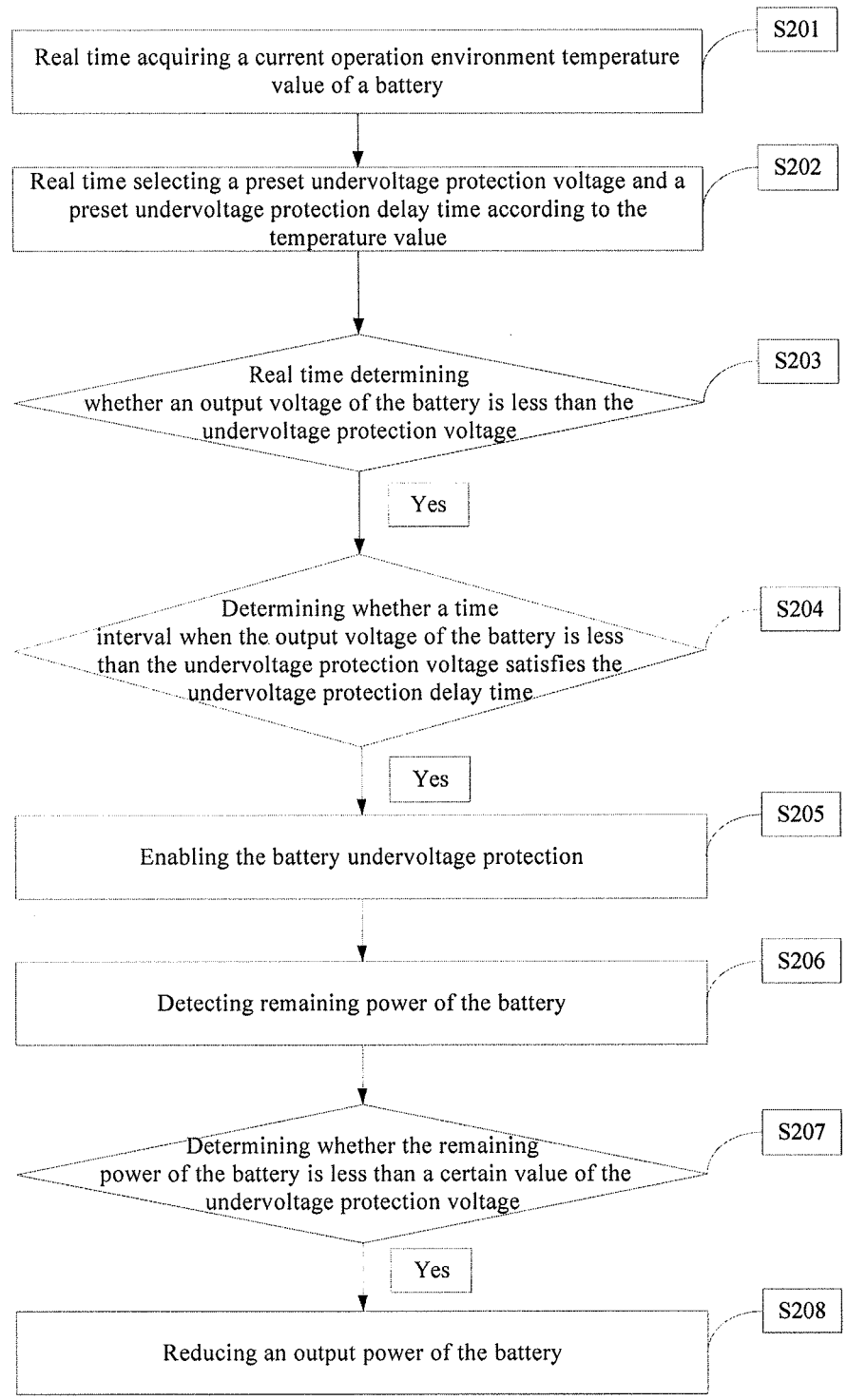
FIG. 2 is a flowchart of a method for dynamically adjusting battery undervoltage protection according to Embodiment 2 of the present invention.

FIG. 2 is a flowchart of a method for dynamically adjusting battery undervoltage protection according to Embodiment 2 of the present invention, as shown in FIG. 2, the method in this embodiment can include steps as follows:

S201, Real time acquiring a current operation environment temperature value of a battery;

Taking a lithium battery as an example, during the operation of the lithium battery, real time detect an operation environment temperature of the lithium battery to acquire the current operation environment temperature value of the lithium battery.

S202, Real time selecting a preset undervoltage protection voltage and a preset undervoltage protection delay time according to the temperature value;

After a temperature value of the lithium battery in the current operation environment is acquired, undervoltage protection parameters of the lithium battery are set according to the acquired temperature value, that is, a preset undervoltage protection voltage and a preset undervoltage protection delay time are selected, particularly, the undervoltage protection voltage and the undervoltage protection delay time are preset according to the specific application situations of the lithium battery, such as a power level of the output device being used.

S203, Real time determining whether an output voltage of the battery is less than the undervoltage protection voltage; if yes, then proceeding to S204:

After the undervoltage protection voltage is determined according to the current operation environment temperature value of the lithium battery, determine the output voltage of the lithium battery, and determine whether the output voltage of the lithium battery is less than the undervoltage protection voltage, that is, determine whether a condition of undervoltage protection is satisfied.

S204, Determining whether a time interval when the output voltage of the battery is less than the undervoltage protection voltage satisfies the undervoltage protection delay time, if yes, then proceeding to S205:

When the output voltage of the lithium battery is determined to be less than the undervoltage protection voltage, a timer starts to count, and determine whether a time interval when the output voltage of the lithium battery is less than the undervoltage protection voltage satisfies the undervoltage protection delay time.

S205, Enabling the battery undervoltage protection;

When the output voltage of the lithium battery is less than the undervoltage protection voltage, and meanwhile, the time interval when the output voltage of the lithium battery is less than the undervoltage protection voltage satisfies the undervoltage protection delay time, enable the battery undervoltage protection.

S206, Detecting the remaining power of the battery;

During the undervoltage protection of the lithium battery, the remaining power of the lithium battery is detected in real time at the same time.

S207, Determining whether the remaining power of the battery is less than a certain value of the undervoltage protection voltage, if yes, then proceeding to S208:

Determine the detected the remaining power of the lithium battery, and determine whether the remaining power of the lithium battery is less than a certain value of the undervoltage protection voltage. The certain value of the undervoltage protection voltage can be set according to the actual demands, for example, the value can be set to 30%.

S208, Reducing an output power of the battery.

When the remaining power of the lithium battery is determined to be less than a certain value of the undervoltage protection voltage, control the output power of the lithium battery and reduce the output power of the lithium battery, and thereby prolong the service time of the lithium battery, so as to ensure that output warm-up of the lithium battery can be performed as long as possible, in case of abnormal undervoltage protection triggering caused by a low temperature condition, and the safety and stability of the lithium battery and its output device can be protected to a maximum extent.

To sum up, on the basis of Embodiment 1, by detecting the remaining power of the battery, controlling the output power of the battery according to the detected result, and thereby prolonging the service time of the battery, so as to ensure that output warm-up of the lithium battery can be performed as long as possible, in case of abnormal undervoltage protection triggering caused by a low temperature condition, and the safety and stability of the lithium battery and the output device can be protected to a maximum extent.

Figure 3:
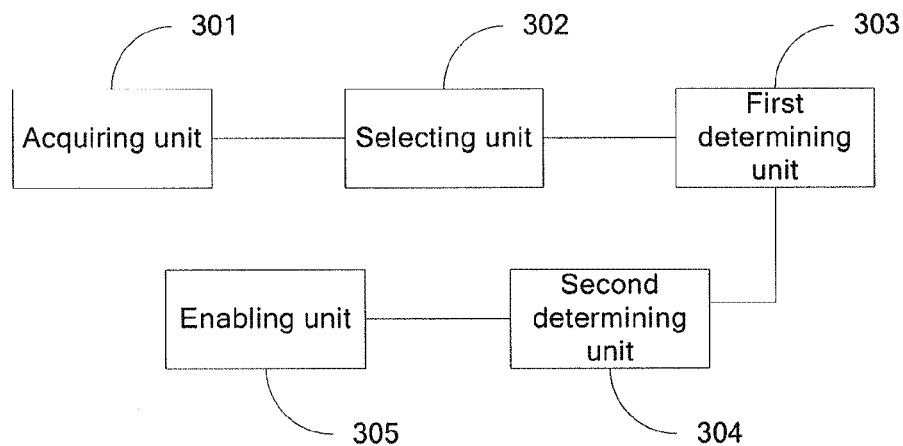
FIG. 3 is a structural schematic diagram of a system for dynamically adjusting battery undervoltage protection according to Embodiment 1 of the present invention.

FIG. 3 is a structural schematic diagram of a system for dynamically adjusting battery undervoltage protection according to Embodiment 1 of the present invention, as show in FIG. 3, the system includes:

an acquiring unit 301, configured to real time acquire a current operation environment temperature value of a battery;

Taking a lithium battery as an example, during the operation of the lithium battery, real time detect an operation environment temperature of the lithium battery to acquire the current operation environment temperature value of the lithium battery by the acquiring unit 301.

a selecting unit 302, configured to real time select a preset undervoltage protection voltage and a preset undervoltage protection delay time according to the temperature value acquired by the acquiring unit;

After a temperature value of the lithium battery in the current operation environment is acquired, undervoltage protection parameters of the lithium battery are set according to the acquired temperature value, that is, a preset undervoltage protection voltage and a preset undervoltage protection delay time are selected, particularly, the undervoltage protection voltage and the undervoltage protection delay time are preset according to the specific application situations of the lithium battery, such as a power level of the output device being used.

A first determining unit 303, configured to real time determine whether an output voltage of the battery is less than the undervoltage protection voltage;

After the undervoltage protection voltage is determined according to the current operation environment temperature value of the lithium battery, determine the output voltage of the lithium battery, and determine whether the output voltage of the lithium battery is less than the undervoltage protection voltage, that is, determine whether a condition of undervoltage protection is satisfied.

A second determining unit 304, configured to determine whether a time interval when the output voltage of the battery is less than the undervoltage protection voltage satisfies the undervoltage protection delay time;

When the first determining unit 303 determines that the output voltage of the lithium battery is less than the undervoltage protection voltage, a timer starts to count, and the second determining unit 304 determines whether a time interval when the output voltage of the lithium battery is less than the undervoltage protection voltage satisfies the undervoltage protection delay time.

An enabling unit 305, configured to enable the battery undervoltage protection.

When the output voltage of the lithium battery is less than the undervoltage protection voltage, and meanwhile, the time interval when the output voltage of the lithium battery is less than the undervoltage protection voltage satisfies the undervoltage protection delay time, enable the battery undervoltage protection.

In the above embodiments, by real time acquiring an operation environment temperature value of the battery, and selecting a preset undervoltage protection voltage and a preset undervoltage protection delay time of the lithium battery according to the acquired temperature value, and enabling the battery undervoltage protection when a time interval when the output voltage of the battery is less than the undervoltage protection voltage satisfies the undervoltage protection delay time. It can be seen that, comparing to the prior art, the method in the present invention can appropriately select an undervoltage protection condition according to an operation environment temperature of the battery, so that a flexible battery undervoltage protection can be achieved.

Particularly, in the above embodiment, one of the implementations for real time selecting the preset undervoltage protection voltage and the preset undervoltage protection delay time according to the temperature value by the selecting unit can be:

The normal temperature value T1, the low temperature value T2, the undervoltage protection voltage V1, the undervoltage protection voltage V2, the undervoltage protection voltage V3, the undervoltage protection delay time t1 and the undervoltage protection delay time t2 and the undervoltage protection delay time t3 are preset according to the specific application situations of the battery.

Determine the current operation environment temperature value of the battery, when the temperature value is more than or equal to the normal temperature value T1, select the undervoltage protection voltage V1 and the undervoltage protection delay time t1; when the temperature value is more than the low temperature value T2 and less than the normal temperature value T1, select the undervoltage protection voltage V2 and the undervoltage protection delay time t2; when the temperature value is less than or equal to the low temperature value T2, select the undervoltage protection voltage V3 and the undervoltage protection delay time t3. Particularly, the normal temperature value T1 can be set to 20° C., and the low temperature value T2 can be set to 5° C. The undervoltage protection voltage V1 can be set to 3.0V, the undervoltage protection voltage V2 can be set to 2.8V, and the undervoltage protection voltage V3 can be set to 2.6V. The undervoltage protection delay time t1, the undervoltage protection delay time t2 and the undervoltage protection delay time t3 can all be set to 5 s.

Figure 4:
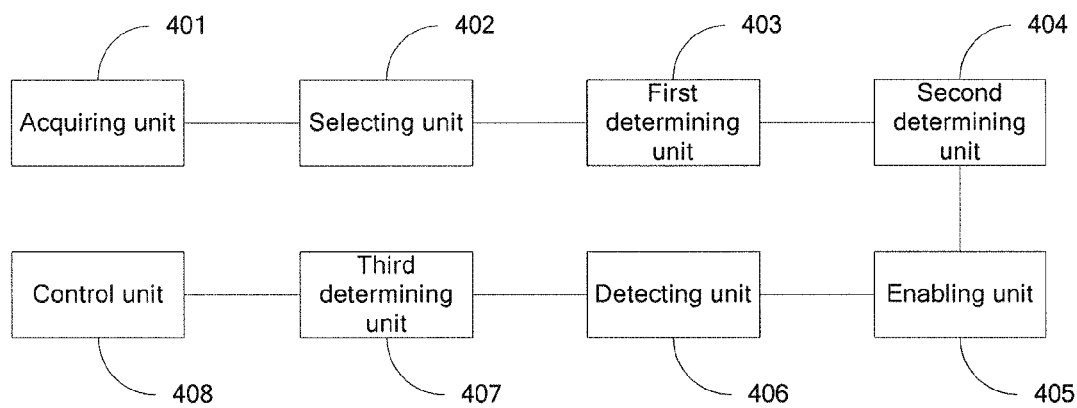
FIG. 4 is a structural schematic diagram of a system for dynamically adjusting battery undervoltage protection according to Embodiment 2 of the present invention.

FIG. 4 is a structural schematic diagram of a system for dynamically adjusting battery undervoltage protection according to Embodiment 2 of the present invention, as show in FIG. 4, the system includes:

an acquiring unit 401, configured to real time acquire a current operation environment temperature value of a battery;

Taking a lithium battery as an example, during the operation of the lithium battery, real time detect an operation environment temperature of the lithium battery to acquire the current operation environment temperature value of the lithium battery by the acquiring unit 401.

a selecting unit 402, configured to real time select a preset undervoltage protection voltage and a preset undervoltage protection delay time according to the temperature value;

After a temperature value of the lithium battery in the current operation environment is acquired, undervoltage protection parameters of the lithium battery are set according to the acquired temperature value, that is, a preset undervoltage protection voltage and a preset undervoltage protection delay time are selected, particularly, the undervoltage protection voltage and the undervoltage protection delay time are preset according to the specific application situations of the lithium battery, such as a power level of the output device being used.

A first determining unit 403, configured to real time determine whether an output voltage of the battery is less than the undervoltage protection voltage;

After the undervoltage protection voltage is determined according to the current operation environment temperature value of the lithium battery, determine the output voltage of the lithium battery, and determine whether the output voltage of the lithium battery is less than the undervoltage protection voltage, that is, determine whether a condition of undervoltage protection is satisfied.

A second determining unit 404, configured to determine whether a time interval when the output voltage of the battery is less than the undervoltage protection voltage satisfies the undervoltage protection delay time;

When the first determining unit 403 determines that the output voltage of the lithium battery is less than the undervoltage protection voltage, a timer starts to count, and the second determining unit 404 determines whether a time interval when the output voltage of the lithium battery is less than the undervoltage protection voltage satisfies the undervoltage protection delay time.

An enabling unit 405, configured to enable the battery undervoltage protection;

When the output voltage of the lithium battery is less than the undervoltage protection voltage, and meanwhile, the time interval when the output voltage of the lithium battery is less than the undervoltage protection voltage satisfies the undervoltage protection delay time, enable the battery undervoltage protection.

A detecting unit 406, configured to detect the remaining power of the battery;

During the undervoltage protection of the lithium battery, the remaining power of the lithium battery is detected in real time at the same time.

A third determining unit 407, configured to determine whether the remaining power of the battery is less than a certain value of the undervoltage protection voltage;

Determine the detected the remaining power of the lithium battery, and determine whether the remaining power of the lithium battery is less than a certain value of the undervoltage protection voltage. The certain value of the undervoltage protection voltage can be set according to the actual demands, for example, the value can be set to 30%.

A control unit 408, configured to reduce an output power of the battery when the third determining unit determines that the remaining power of the battery is less than a certain value of the undervoltage protection voltage.

When the remaining power of the lithium battery is determined to be less than a certain value of the undervoltage protection voltage, control the output power of the lithium battery and reduce the output power of the lithium battery, and thereby prolong the service time of the lithium battery, so as to ensure that output warm-up of the lithium battery can be performed as long as possible, in case of abnormal undervoltage protection triggering caused by a low temperature condition, and the safety and stability of the lithium battery and its output device can be protected to a maximum extent.

To sum up, on the basis of Embodiment 1, by detecting the remaining power of the battery, controlling the output power of the battery according to the detected result, and thereby prolonging the service time of the battery, so as to ensure that output warm-up of the lithium battery can be performed as long as possible, in case of abnormal undervoltage protection triggering caused by a low temperature condition, and the safety and stability of the lithium battery and the output device can be protected to a maximum extent.

Persons skilled in the art may appreciate that, all or partial steps of the above method embodiments can be implemented in a program instruction related hardware. The program can be stored in a computer readable medium. When the program is executed, the steps in the above method embodiments are performed; the storage medium includes various media capable of storing program codes, such as a read only memory (ROM), a random access memory (RAM), a floppy disk, or an optical disk and the like.

The embodiments of the device are exemplary only, the units described as separated parts can be or cannot be physically separated, and the parts shown as units can be physical units or not, that is, the parts can be located in a same place or distributed in at least two network units. Part or all of the modules of the device can be selected to achieve the purposes of the solution of the embodiment according to the actual demands. It can be understood and implemented by those of ordinary skill in the art without creative efforts.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for protecting a battery under an undervoltage status, comprising:
   acquiring an environment temperature value;
   selecting a preset undervoltage protection voltage and a preset undervoltage protection delay time based on the environment temperature value; and
   protecting the battery under the undervoltage status based on the preset undervoltage protection voltage and the preset undervoltage protection delay time.

2. The method according to claim 1, wherein the protecting step comprises:
   detecting remaining power of the battery;
   determining that the remaining power of the battery is less than a certain value of the preset undervoltage protection voltage; and
   reducing an output power of the battery.

3. A system for protecting a battery under an undervoltage status, comprising:
   a sensor, configured to acquire an environment temperature value;
   a memory, configured to store a set of undervoltage protection voltage and preset undervoltage protection delay time; and
   a processor, electronically coupled to the sensor and the memory, and configured to:
   select a preset undervoltage protection voltage and a preset undervoltage protection delay time of the set based on the environment temperature value; and
   protect the battery under the undervoltage status based on the preset undervoltage protection voltage and the preset undervoltage protection delay time.

4. The system according to claim 3, wherein the processor is further configured to:
   detect remaining power of the battery;
   determine that the remaining power of the battery is less than a certain value of the preset undervoltage protection voltage; and
   reduce an output power of the battery.

5. The method according to claim 1, wherein the protecting step comprises:
   determining that an output voltage of the battery is less than the preset undervoltage protection voltage;
   determining that a time interval is greater than the preset undervoltage protection delay time; and
   protecting the battery under the undervoltage status.

6. The method according to claim 1, wherein the selecting step comprises:
   determining that the environment temperature value is greater than or equal to a normal temperature value T1; and
   selecting an undervoltage protection voltage V1 and an protection delay time t1 as the preset undervoltage protection voltage and the preset undervoltage protection delay time.

7. The method according to claim 1, wherein the selecting step comprises:
   determining that the environment temperature value is less than a normal temperature value T1;

determining that the temperature value is greater than a low temperature value T2 and less than the normal temperature value T1; and selecting an undervoltage protection voltage V2 and an undervoltage protection delay time t2 as the preset undervoltage protection voltage and the preset undervoltage protection delay time.

8. The method according to claim 1, wherein the selecting step comprises:
determining that the environment temperature value is less than a normal temperature value T1;
determining that the environment temperature value is less than or equal to the low temperature value T2; and
selecting an undervoltage protection voltage V3 and an undervoltage protection delay time t3 as the preset undervoltage protection voltage and the preset undervoltage protection delay time.

9. The system according to claim 3, wherein the processor is further configured to:
determine that an output voltage of the battery is less than the preset undervoltage protection voltage;
determine that a time interval is greater than the preset undervoltage protection delay time; and
protect the battery under the undervoltage status.

10. The system according to claim 3, wherein the processor is further configured to:
determine that the environment temperature value is greater than or equal to a normal temperature value T1; and select an undervoltage protection voltage V1 and an protection delay time t1 of the set as the preset undervoltage protection voltage and the preset undervoltage protection delay time.

11. The system according to claim 3, wherein the processor is further configured to:
determine that the environment temperature value is less than a normal temperature value T1;
determine that the temperature value is greater than a low temperature value T2 and less than the normal temperature value T1; and
select an undervoltage protection voltage V2 and an undervoltage protection delay time t2 of the set as the preset undervoltage protection voltage and the preset undervoltage protection delay time.

12. The system according to claim 3, wherein the processor is further configured to:
determine that the environment temperature value is less than a normal temperature value T1;
determine that the environment temperature value is less than or equal to the low temperature value T2; and
select an undervoltage protection voltage V3 and an undervoltage protection delay time t3 of the set as the preset undervoltage protection voltage and the preset undervoltage protection delay time.

* * * * *